United States Patent [19]

Richard

[11] Patent Number: 4,859,404
[45] Date of Patent: Aug. 22, 1989

[54] REACTOR VESSEL INTERNALS STORAGE AREA ARRANGEMENT

[75] Inventor: Joseph W. Richard, West Mifflin, Pa.

[73] Assignee: Westinghouse Electric Corp., Pittsburgh, Pa.

[21] Appl. No.: 213,209

[22] Filed: Jun. 29, 1988

[51] Int. Cl.⁴ .............................................. G21C 19/00
[52] U.S. Cl. .................................. 376/293; 376/285; 376/262; 376/461
[58] Field of Search ............... 376/262, 263, 261, 461, 376/260, 293, 294, 295, 463, 285

[56] References Cited

U.S. PATENT DOCUMENTS

| | | |
|---|---|---|
| 3,752,737 | 8/1973 | Frisch et al. |
| 3,836,429 | 9/1974 | Frisch et al. |
| 3,984,282 | 10/1976 | Kleimola. |
| 4,050,983 | 9/1977 | Kleimola. |
| 4,056,435 | 11/1977 | Carlier et al. |
| 4,080,256 | 3/1978 | Braun et al. |
| 4,134,789 | 1/1979 | Aubert. |
| 4,158,599 | 6/1979 | Andrews et al. |
| 4,210,614 | 7/1980 | Kleimola ............................. 261/124 |
| 4,272,321 | 6/1981 | Betancourt et al. ................. 376/262 |
| 4,302,290 | 11/1981 | Mazur et al. ........................ 376/287 |
| 4,313,793 | 2/1982 | Klumb et al. ....................... 376/260 |
| 4,427,621 | 1/1984 | Gillett et al. ....................... 376/260 |
| 4,585,611 | 4/1986 | Perl .................................... 376/260 |
| 4,587,080 | 5/1986 | Johnson .............................. 376/282 |
| 4,647,422 | 3/1987 | Altman ............................... 376/262 |
| 4,778,645 | 10/1988 | Altman et al. ...................... 376/260 |

Primary Examiner—Brooks H. Hunt
Assistant Examiner—Daniel Wasil
Attorney, Agent, or Firm—Michael G. Panian

[57] ABSTRACT

Concrete support ledges (67) and columns (94) for the upper internals (60) and lower internals (63) structures are poured into the floor (41) and walls (36) of the refueling cavity (33) at the time of initial plant construction. Such concrete supports (67, 94) provide greater stability and do not require any external bracing. A pedestal assembly (100) is associated with each of the concrete supports (67, 94) to provide an adjustable and secure support for the internals structures (60, 63).

20 Claims, 6 Drawing Sheets

REACTOR VESSEL INTERNALS STORAGE AREA ARRANGEMENT

TECHNICAL FIELD

The invention relates to nuclear reactors used in the production of electricity, and more particularly to a containment building having an integrally formed reactor vessel internals storage area arrangement.

BACKGROUND OF THE INVENTION

Figure 1:
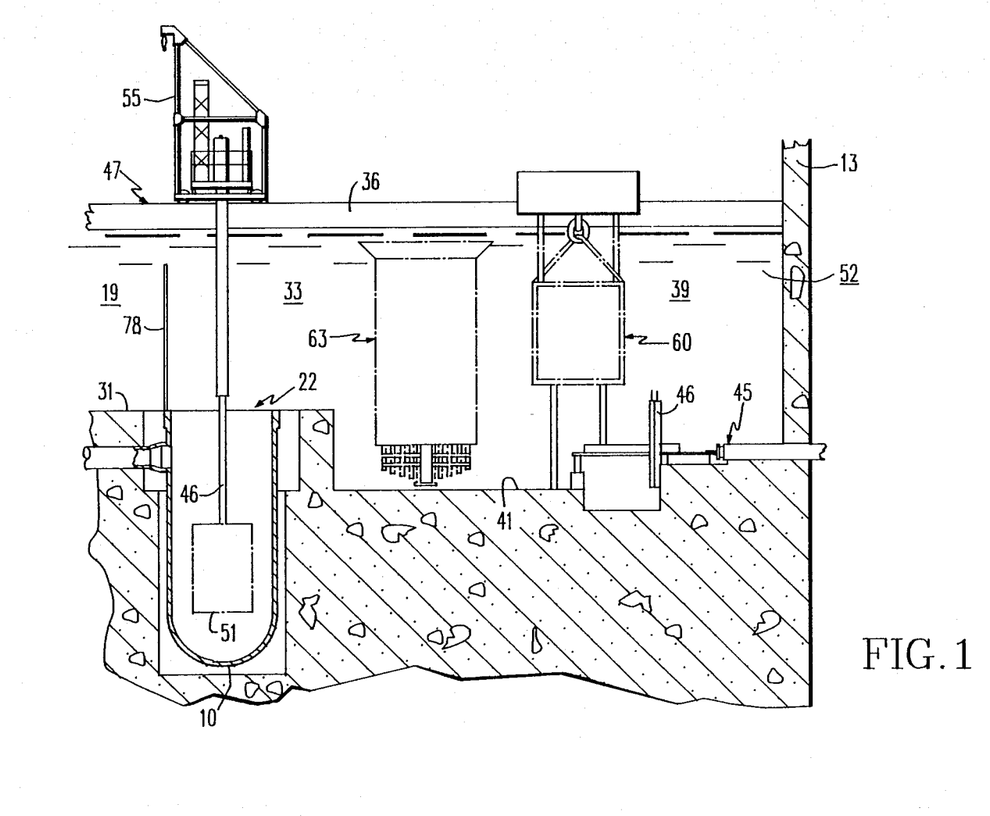
FIG. 1 shows a typical prior art arrangement for the interior space of a containment building during refueling operations.

In a typical nuclear reactor power plant, an example of one design of such being shown in FIG. 1, the reactor pressure vessel utilized to generate heat, as well as other components such as steam generators, pumps, pressurizer, and associated piping, are housed in a containment building. Typically, a containment building may be made of concrete, stainless steel, or other appropriate material. The containment building defines a refueling cavity and completely encloses the entire reactor and reactor cooling system (RCS) and insures that an acceptable limit for release of radioactive materials to the surrounding/local environment would not be exceeded, even in the unlikely occurrence of a gross failure of the RCS. All operations and procedures associated with the functioning of the reactor vessel and RCS are performed within the containment building.

Typically, the refueling cavity is a split-level area, wherein the upper level contains a reactor cavity and the lower level consists of a fuel transfer canal. The reactor vessel is housed within the reactor cavity which is also a reinforced concrete structure. When filled with water for refueling, it forms a pool above the reactor within the refueling cavity. The refueling cavity is filled to a depth that limits radiation at the surface of the water, usually up to an operating deck from which maintenance procedures are conducted, to acceptable levels. Typically, the water is in the form of borated water, which helps to minimize exposure levels. The water provides an effective and transparent radiation shield for personnel on the operating deck, as well as a reliable medium for removal of decay heat from the reactor vessel. During refueling, spent or depleted fuel is removed from the reactor core, transferred under water, and placed in the fuel transfer system by the plant's refueling machine; and new or fresh fuel is similarly transferred from a fuel transfer building and loaded therein. During this down time, other maintenance or inspection procedures can also be performed. In order to perform these procedures, certian components within the reactor vessel need to be removed from its interior.

The main components within the reactor vessel apart from individual fuel assemblies, are the reactor upper and lower internals structures. The internals structures are designed such that they can be completely removed from the vessel. This facilitates the in-service inspection of the internals and provides access for inspection of the entire inner surface of the vessel. These structures are stored within the refueling cavity during these maintenance procedures.

The reactor internals structures are designed to support and position the reactor core fuel assemblies and control rod assemblies, and to provide a passageway for the reactor coolant and support in-core instrumentation. An exemplary reactor vessel lower internals assembly may consist of a core barrel, core baffle, lower core support plate and support columns, thermal shield, and the intermediate diffuser plate and bottom support casting. Within the core barrel are the axial baffle and former plates which are attached to the core barrel wall, and form the enclosure periphery of the assembled core. The lower core support plate is positioned at the bottom level of the core below the baffle plates and provide support and orientation for the fuel assemblies. The lower core support plate is perforated and contains fuel assembly alignment pins on its upper surface for the proper orientation of the fuel assemblies. The lower core support structure also serves to provide passageways and control for the coolant flow.

An exemplary reactor vessel upper core support structure or internals assembly includes the top support plate, the upper core plate, support columns, and control rod guide tubes. The main functions of the reactor vessel upper internals are to align and locate the upper ends of the fuel assemblies also with fuel assembly alignment pins which project downward from the bottom of the upper core plate, and to guide the control rod cluster and associated drive shafts. The guide tube assemblies sheath and guide the control rod drive shafts in control rods. The control rod drive shafts remain with the upper internals as they are removed from the reactor core.

During a typical maintenance procedure, such as refueling or inspection of the interior of the reactor vessel, the reactor is first shut down and cooled to ambient conditions. Then the reactor vessel closure head studs and nuts are removed from the reactor vessel and guide studs are installed in, typically, three selected stud holes. The remainder of the stud holes are plugged. The guide studs serve as a means for proper orientation of fuel assemblies and the reactor internals, as well as reinstallation of the reactor vessel head assembly. As the reactor vessel head is raised by the plant's overhead polar crane, the reactor cavity is filled with borated water to the level of the vessel flange. The head is slowly lifted while water is continually pumped into the cavity; the water level and vessel head being raised simultaneously. The reactor vessel head is finally removed to a dry storage area within the containment building. The reactor vessel upper internals, and associated control rod drive shafts, are then removed. The reactor internals are removed by a reactor internals lifting device, which consist of a structural frame suspended from the overhead crane. The frame is lowered onto the guide tube support plate of the internals and manually bolted to the support plate. Bushings on the frame engage the guide studs to provide the precise guidance during removal and replacement of the internals package. The upper internals and associated control rod drive shafts are lifted out of the vessel and stored in the underwater storage stand in the refueling cavity. The fuel assemblies are now free from obstructions and are ready to be moved from the reactor core. When necessary, the lower internals structures are also removed in the same manner and placed upon their respective storage stand.

The refueling cavity is large enough to provide storage space for the reactor upper and lower internals (shown in phantom in FIG. 1), and for the miscellaneous tools used for the refueling and maintenance. The internals structures are stored on typically stainless steel structural fixtures installed in the refueling cavity. The upper internals storage stand is used to support the upper internals structure from its top flange when removed from the reactor vessel. The construction of the internals does not readily permit them to be totally supported from the bottom in a conventional manner and are therefore additionally supported from above. The stand, as well as the upper internals, remain completely underwater during the maintenance procedures. The reactor vessel lower internals are likewise stored upon a storage stand constructed within the refueling cavity. The lower internals however can be stored and supported by completely resting on the lower core support plate. These storage stands are typically designed in the form of a welded and bolted box section. In order to construct these support structures, they must be put in place after the containment building has been constructed. Due to the design of the storage stands, their construction is very expensive and time consuming. Such a large stainless steel structure can be very hard to fabricate, and therefore requires specialized tooling and training. Extensive drilling is typically required to assemble the stands inside the containment building. Also these structures must be heavily supported laterally so as to prevent any damage to the internals structures while stored thereon. They must also be positioned within the refueling cavity in such a manner so as to not interfere with refueling, or other maintenance operations. Great care must be taken not to damage the upper and lower internals structures while stored within the refueling cavity during the transfer of fuel assemblies out of and into the reactor vessel core.

DISCLOSURE OF THE INVENTION

It is therefore an object of the present invention to provide a reactor vessel internals storage area arrangement which is easier and less expensive to construct.

It is another object of the present invention to provide a more structurally sound storage stand for the reactor vessel internals.

It is a further object of the present invention to provide such a storage arrangement which minimizes the danger of damage to the internals structures during the various maintenance procedures.

The above objects are attained by the present invention, according to which, briefly stated, a containment building for a nuclear reactor pressure vessel having an upper internals structure and a lower internals structure which are removed therefrom during maintenance procedures, the containment building defining a refueling cavity having concrete floor and walls, the nuclear reactor pressure vessel being situated within an opening in the refueling cavity floor and the upper and lower internals structures are situated within the refueling cavity during the maintenance procedures. The improvement comprises an internals storage means integrally formed within the floor and walls of the refueling cavity.

BRIEF DESCRIPTION OF THE DRAWINGS

The invention will become more apparent by reading the following detailed description in conjunction with the drawings, which are shown by way of example only, wherein.

DESCRIPTION OF THE PREFERRED EMBODIMENT

As represented in FIG. 1, in one design of a typical nuclear reactor power plant, a nuclear reactor pressure vessel 10 is housed within a generally cylindrical concrete containment building 13. The preferably concrete walls, sides, and roof of the containment building are steel reinforced and typically have a steel liner (not shown) on the interior surface thereof. The containment building 13 also houses the reactor coolant system (RCS) which is comprised of steam generators, associated piping, and reactor coolant pumps (not shown), etc. The reactor vessel 10 of a typical pressurized water reactor (PWR) is situated within a reactor cavity 19 in such a manner that the reactor vessel flange 22, upon which the reactor vessel head assembly (not shown) is sealingly engaged during plant operation, is substantially level with a first floor portion 31 of refueling cavity 33. The refueling cavity 33 is typically a two-part, split-level area which generally includes the area above and about the reactor vessel 10 (i.e., the reactor cavity 19) which is generally defined by protective walls 36 surrounding the reactor cavity 19 on three sides and a fuel transfer canal 39 on a fourth (walls 36 also forming the fuel transfer canal). The fuel transfer canal 39, having a second floor portion 41, of the containment building 13 is cooperatively associated with a fuel storage building (not shown) by way of a fuel transfer tube 45, for passage of fuel assemblies 46 between the containment building 13 and the fuel storage building.

To assist in removal of the reactor vessel head assembly, as well as manipulation of other components and tooling, the containment building 13 includes an overhead polar crane situated above the RCS and the operating deck 47. With this configuration, power plant personnel can safely perform the various maintenance procedures associated with the reactor vessel 10 and the RCS remotely from the operating deck 47 with the aid of long handled tools supported from the polar crane. Although various power plant designs have different sized refueling cavities 33, a typical containment building 13 can have a refueling cavity floor 31 located about 6 meters (20 feet) or more below the operating deck 47, the fuel transfer canal floor portion 41 being still lower. In this manner the reactor vessel 10, especially the core 51, can be completely covered with coolant 52, typically water, when the head assembly is removed in order to minimize overall man-rem exposure to maintenance personnel. In order to assist in the transfer of fuel assemblies 46 to and from the fuel building to the reactor vessel 10, the containment building also includes a refueling machine 55.

During these various maintenance procedures, an example of which is the refueling of the reactor core 51, the reactor vessel upper 60 and lower 63 internals structures are removed from the reactor vessel 10. The refueling cavity 33, which includes the fuel transfer canal 39, has sufficient area for the storage of the upper 60 and lower 63 internals structures; as well as the various tooling used therewith. In order to provide for a more cost effective storage means for the internals structures, the present invention was designed. The upper and lower internals storage area arrangement, in addition, provides a more stable and reliable support structure.

Figure 2:
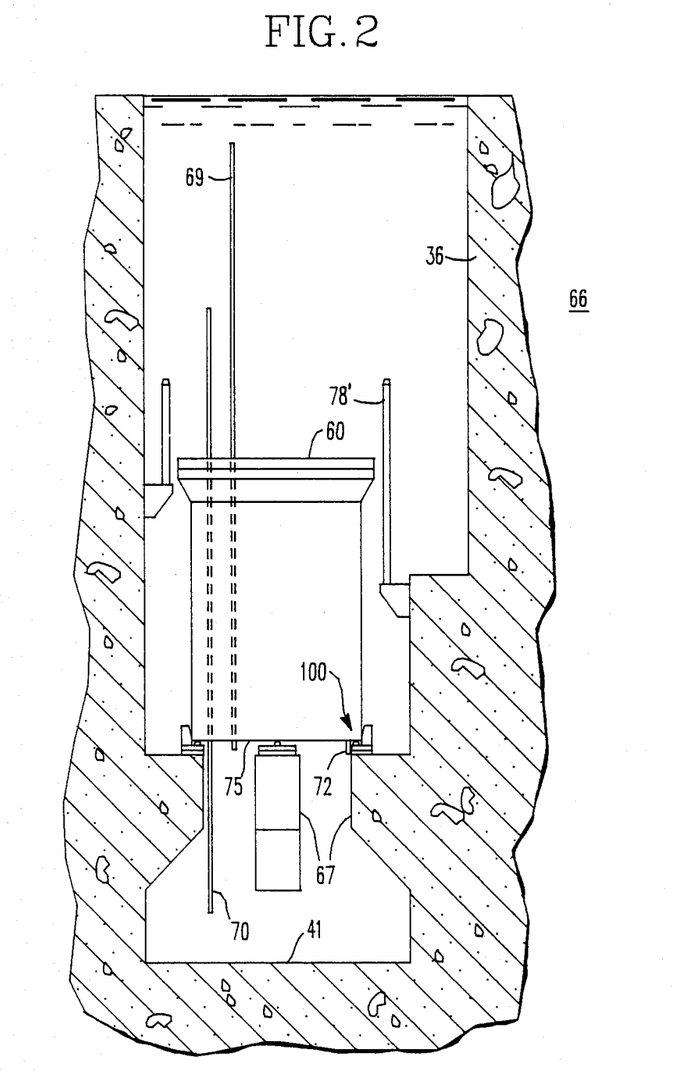
FIG. 2 is the reactor vessel upper internals storage area arrangement of the present invention.
Figure 3:
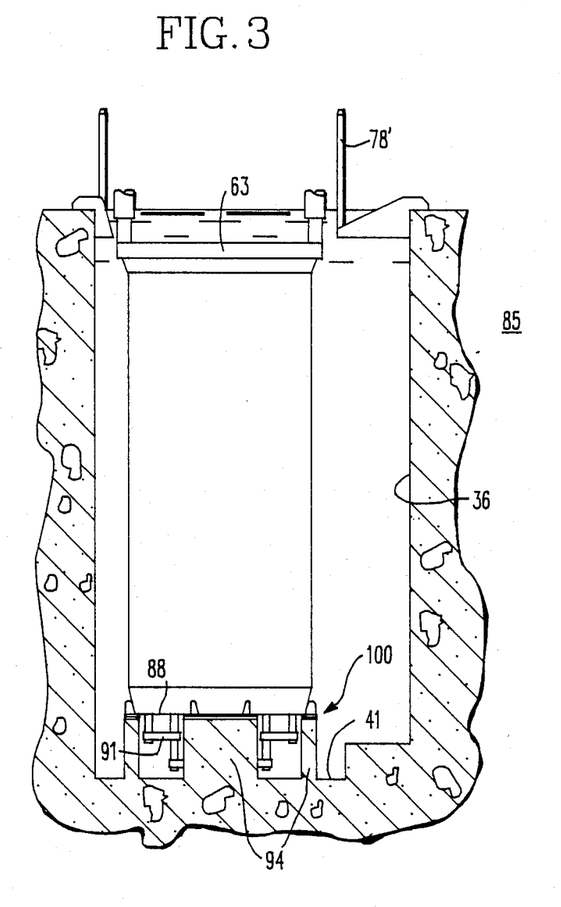
FIG. 3 is the lower internals storage arrangement of the present invention.
Figure 5A:
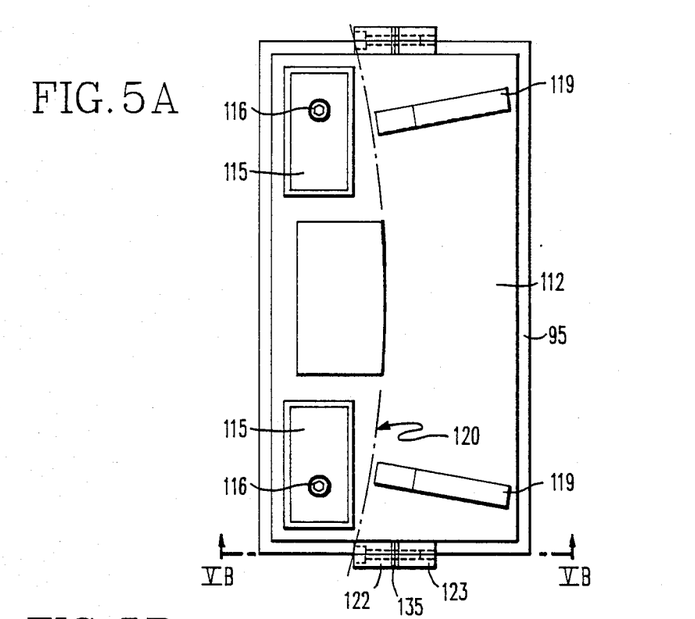
FIG. 5A is a top view of the upper internals pedestal assembly of FIG. 2.
Figure 5B:
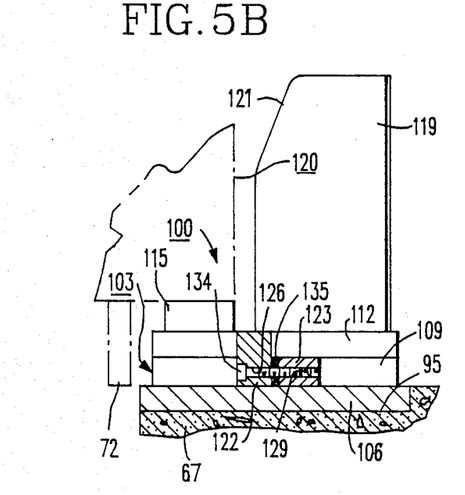
FIG. 5B is a view taken along the lines VB—VB of FIG. 5A.

The upper internals storage area 66 is shown in FIGS. 2, 5A and 5B. Preferably, for the upper internals 60 concrete support ledges 67 project outward from the walls 36 of the refueling cavity 33, or radially inwardly with respect to each other, at an intermediate axial level above the floor 41, since some designs of the upper internals do not readily lend themselves to being fully supported from the bottom. This is because, as shown in FIG. 2, the control rod drive shafts 69 remain with the upper internals 60 after they are removed from the reactor vessel 10. When the control rod drive shafts 69 are in the full down position 70, they can project below the upper internals 60 a distance of about 430 cm (14 feet). Also, a plurality of fuel assembly alignment pins 72, used to align the fuel assemblies 46 within the reactor core 51, are secured to the bottom of the upper core plate 75 of the upper internals structure 60. Care must be taken not to bend of damage either the control rod drive shafts 69 or the fuel assembly alignment pins 72. The support ledges 67 are designed such that the weight of the upper internals 60 can more readily be fully supported by resting on the upper core plate 75, while providing sufficient clearance for alignment pins 72 and control rod drive shafts 69.

Also secured to the walls 36 of the refueling cavity 33 in the area of the upper internals storage area 66 are at least two guide studs 78', similar to those placed upon the reactor vessel flange 22 when removing the vessel head. Since the tool used to remove the upper internals 60 cooperates with the guide studs 78 secured to the reactor vessel 10 for purposes of alignment, the guide studs 78' which are part of the upper internal storage area 66 serve the same purpose. This will increase the efficiency of refueling procedures in that reactor internals are more easily removed from and replaced within the reactor vessel 10 in a proper orientation.

The lower internals storage area 85 is shown in FIGS. 3, 6A, 6B and 6C. Unlike the upper internals 60, the lower internals 63 are more readily capable of being fully supported from the bottom support plate 88. This is due to the fact that the tie plates 91 which are part of the lower internals support structure do not extend to the outer periphery thereof; sufficient room exists such that the lower internals can easily be fully supported by concrete support columns 94 which project upward from the refueling cavity floor 41. Here, as well, upwardly directed guide studs 78' are provided to properly orient the lower internals 63 with respect to the reactor vessel 10 upon removal from and replacement within the vessel.

Preferably for each of the upper 66 and lower 85 internals storage areas, four concrete supports 67, 94 (respectively) are oriented at 90° angles to each other, thereby forming a generally circular array. The concrete supports for the storage stands are poured into the floor 41 and walls 36 of the refueling cavity 33 at the time of initial plant construction. This obviates the need for specially designing and constructing large stainless steel structures within the containment building 13. The storage structures for the upper and lower internals are thus made more cost effectively.

Associated with each support ledge 67 and column 94, on a first 95 and second 96 top surface, respectively thereof, is a pedestal assembly 100. The components which make up the pedestal assemblies 100, are virtually identical for both the upper 66 and lower 85 internals storage areas. The pedestal assemblies 100 for the upper internals 60 can be seen in greater detail in FIGS. 5A and 5B; the pedestal assemblies 100 for the lower internals can be seen in FIGS. 6A, 6B and 6C. Since the lower internals 63 tend to be somewhat larger and heavier than the upper internals 60, the top surface 96 of the concrete support column 94 upon which each lower internal pedestal assembly 100 is secured is somewhat larger for the lower internals 63 than that for the upper internals 60.

Figure 4:
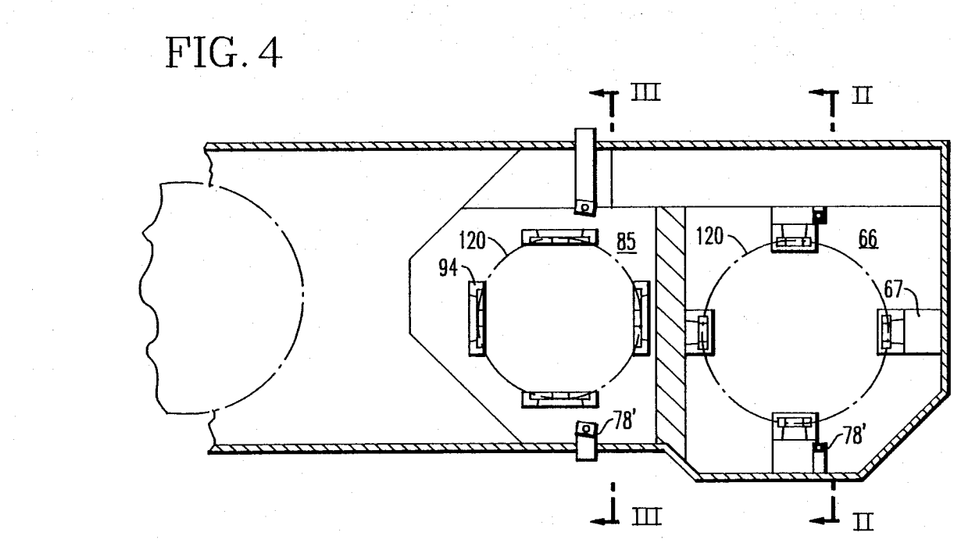
FIG. 4 shows a top plan view of reactor vessel internals storage area arrangement of FIGS. 2 and 3.

The pedestal assemblies 100 are mainly comprised of a horizontally disposed base assembly 103 consisting of an embedment plate 106 and a middle plate 109. The embedment plate 106, preferably, is rigidly secured to the respective top surface 95, 96 by being partially embedded within the concrete support ledge 67 or column 94, respectively, prior to its hardening. The middle plate 109 is rigidly secured to the embedment plate 106 by means of bolts (not shown) which project upward from the concrete supports 67, 94 and through associated holes in the embedment plate 106. A top plate 112 is operatively associated with the middle plate 109 in such a manner that it is laterally adjustable with respect thereto; the purpose and operation of which will be more fully described hereinafter. Disposed on top of the top plate 112 is one or more, and preferably two, bearing pads 115 upon which the internals structures 60, 63 rest. The top plate 112 and bearing pads 115 are secured to the middle plate 109 by bolts 116. The top plate has large through-holes 117 for the bolts 116 to pass through to permit lateral adjustment of the top plate 112 with respect to the middle plate 109. The bolts 116 are threaded into threaded aperture 118 in the middle plate 109. Two vertically oriented guide plates 119 are securely mounted on each top plate 112, such as by welding, at such an angle so as to define a generally circular area, designated at 120. In this configuration, the upper 60 or lower 63 internals structures are readily received on bearing pads 115 within the generally circular area 120 defined by the guide plates 119 of the pedestal assemblies 100. In order to help orient the internals structures in the storage areas, the guide plates 119 have a radially inwardly directed chamfered leading edge 121 on their upper portion to facilitate placement of the internals structures upon the bearing pads 115. One possible orientation of the upper and lower internals structures storage areas 66, 85 within the refueling cavity 33 can be seen in a plan view, shown in FIG. 4.

Lateral adjustment of the top plate 112, as well as the attached guide plates 119 and bearing pads 115, is accomplished by means of a pair of cooperating bosses 122 and 123 which are rigidly secured to the sides of the top 112 and middle 109 plates, respectively. The boss 122 of the top plate 112 has a countersunk bore 126 therethrough, whereas the boss 123 of the middle plate 109 has an internally threaded aperture 129 therein, concentrically aligned with the countersunk bore 126. Preferably, at the time of initial plant construction (i.e., before the reactor components have become irradiated) the reactor upper 60 and lower 63 internals structures are placed within their respective storage areas 66 and 85, within the generally circular area 120 outlined by the guide plates 119, upon the pedestal assemblies 100. The top plate 112 is laterally adjusted so as to provide for a sufficient nominal clearance, typically about 0.16 cm, between the internals structure and the guide plates 119. Rotation of a cap screw 134 allows the top plate 112 to be laterally adjusted with respect to the middle plate 109. When the proper positioning is determined, a shim pack 135, if necessary, is inserted between the bosses 122 and 123. The cap screw 134 passes through the countersunk bore 126 of the top plate boss 122, through the shim pack 135 and is threaded into the aperture 129 of the middle plate boss 123. The cap screws 134 on both sides of the pedestal assembly 100 are then securely tightened. The bolts 116 are then securely threaded into the threaded aperture 118 of the middle plate 109. In this manner, and in cooperation with guide studs 78', the upper 60 and lower 63 internals structures will not be damaged when they are removed from and replaced within the reactor vessel 10.

Figure 6A:
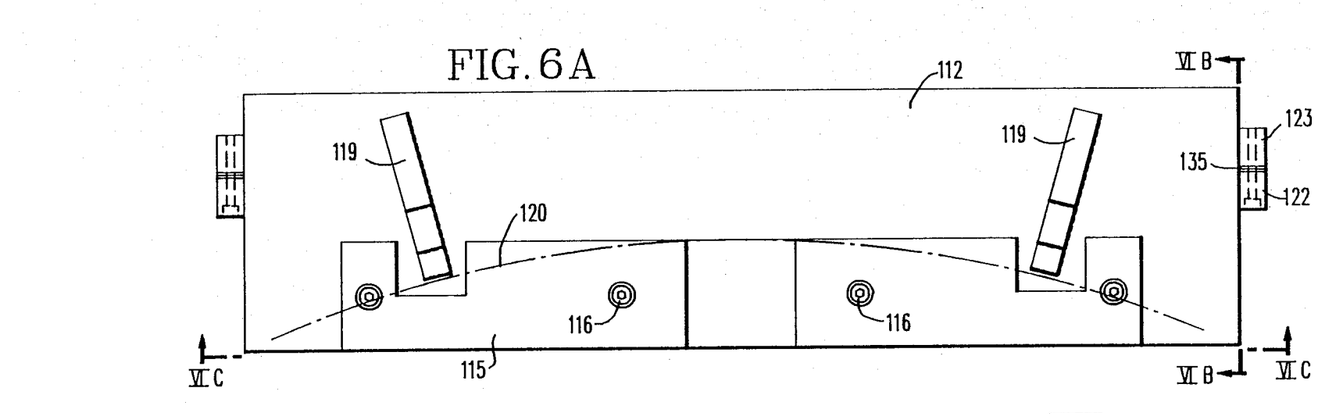
FIG. 6A is a top view of the lower internals pedestal assembly of FIG. 3.
Figure 6B:
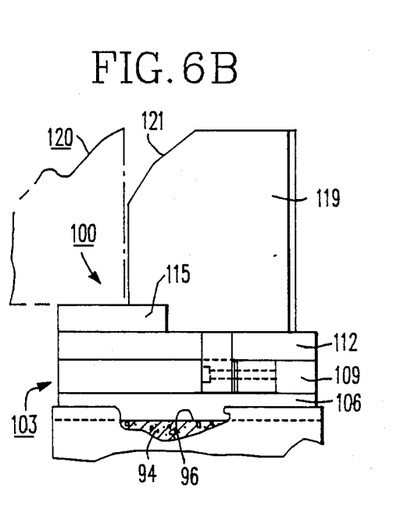
FIG. 6B is a view taken along the lines VIB—VIB of FIG. 6A.
Figure 6C:
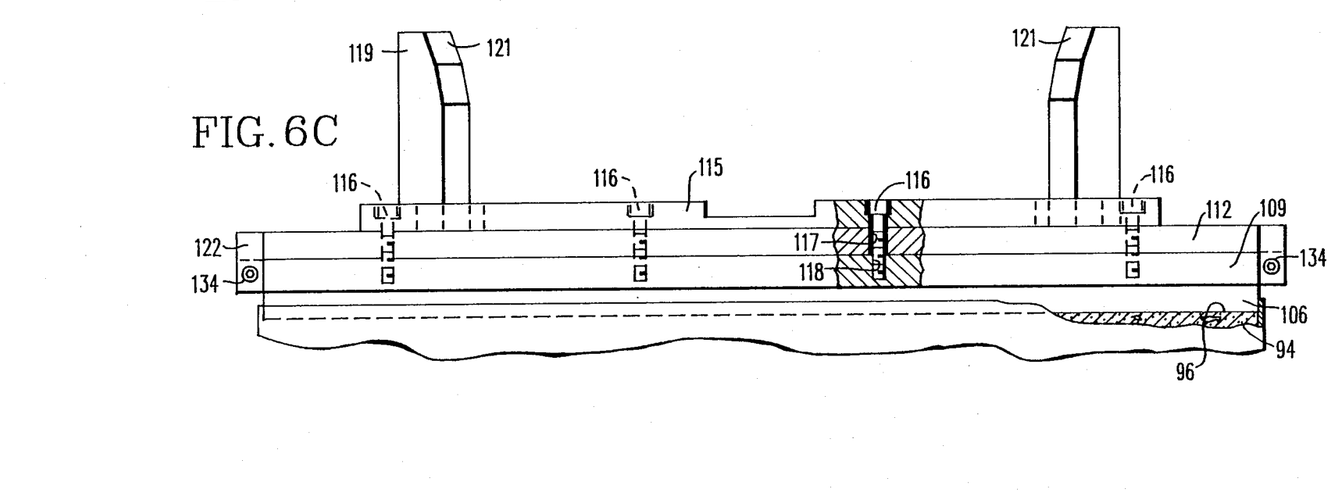
FIG. 6C is a view taken along the lines VIC—VIC of FIG. 6A.

As can be seen by comparing FIGS. 5B and 6B, the pedestal assembly 100 for the upper internals storage area 66 does not quite extend to the edge of the support ledge 67, in order to provide clearance for the alignment pins 72. Since the lower internals 63 are a larger and heavier structure than the upper internals 60, it is preferable that the pedestal assembly 100 for the lower internals storage area 85 extend under a larger area of the bottom support plate 88.

Since the refueling cavity 33 defines a large available area for the storage of the upper 60 and lower 63 internals, as well as associated equipment, these support ledges 67 and columns 94, respectively, can be poured anywhere within the walls 36 and floor 41 of the refueling cavity 33. All the embedment plates 106 that are embedded in the concrete can be shop manufactured and do not have to be specially manufactured for each plant. The concrete supports 67, 94 provide greater stability than a specially manufactured and fabricated stainless steel support structure; and do not require any external bracing to laterally support the weight of the upper and lower internals support structures.

While specific embodiments of the invention have been described in detail, it will be appreciated by those skilled in the art that various modifications and alterations would be developed in light of the overall teachings of the disclosure. For example, the storage areas can be integrally formed within the floor 31 of the reactor cavity 19, much in the same way as the reactor vessel 10 is disposed therein. Accordingly, the particular arrangements disclosed are meant to be illustrative only and not limiting as to the scope of the invention which is to be given the full breadth of the appended claims and in any and all equivalents thereof.

What is claimed is:

1. In a containment building for a nuclear reactor pressure vessel having an upper internals structure and a lower internals structure which are removed therefrom during maintenance procedure, the containment building defining a refueling cavity having floor and walls, the reactor vessel being situated within an opening in the refueling cavity floor in such a manner that a substantially open area exists above and about the reactor vessel for storage of said upper and lower internals structures during said maintenance procedures, the improvement comprising a storage means for said upper and lower internals structures, said storage means including supports for respectively supporting said upper and lower internals structures, said support for one of said internals structure including support ledges integrally formed with and projecting outward from said walls, said support for other of said internals structure being integrally formed with said floor.

2. The improvement as recited in claim 1, wherein said internals storage means further includes:
   (a) an upper internals storage area having a support integrally formed with said walls of the refueling cavity which includes support ledges projecting outward from said walls; and
   (b) a lower internals storage area having a support integrally formed with the floor of the refueling cavity which includes support columns projecting upward from the floor.

3. The improvement as recited in claim 2, wherein each of said support ledges and columns further comprises:
   a base secured to each of said support ledges and columns;
   at least one vertically oriented guide plate disposed above each base, said guide plates being disposed to define a generally circular area within which said upper and lower internals structures are each received, respectively, within said upper and lower internals storage areas; and
   means for providing lateral adjustment of said guide plates with respect to the base disposed between said base and guide plate.

4. The improvement as recited in claim 3, wherein said guide plates have a radially inwardly directed chamfered leading edge on their top portions to facilitate placement of said internals structures upon said support ledges and columns.

5. The improvement as recited in claim 4, wherein each storage area further includes a plurality of upwardly directed guide studs which project above the storage area to provide proper orientation of said internals structures within the storage area upon removal from and replacement within the reactor vessel.

6. The improvement as recited in claim 3, wherein the base includes and embedment plate at least partially embedded within each of said support ledges and columns and a middle plate secured to the embedment plate.

7. The improvement as recited in claim 6, wherein the lateral adjustment means is further comprised of:
   a top plate disposed between said middle and guide plates;
   a top plate boss secured to the top plate and having a bore therethrough;
   a middle plate boss secured to the middle plate and having a threaded aperture therein, the aperture being concentric with the bore; and
   a cap screw adapted to pass through the bore and threadingly engage the aperture, whereby the top plate is laterally translated with respect to the middle plate by rotation of the cap screw within the aperture.

8. The improvement as recited in claim 7, wherein the top plate further includes a bearing pad thereon for receiving said respective internals.

9. The improvement as recited in claim 2, wherein the containment building walls and floor, and each of said integrally formed upper and lower internals storage areas and supports are made of concrete.

10. In a nuclear reactor power plant which includes a nuclear reactor pressure vessel having an upper internals structure and a lower internals structure which are removed therefrom while performing maintenance procedures, the nuclear reactor pressure vessel being housed within a generally cylindrical concrete containment building having concrete floor and walls, the containment building defining a refueling cavity comprised of a reactor cavity and a fuel transfer canal, the reactor pressure vessel being disposed within the reactor cavity and said upper and lower internals structures are stored within the fuel transfer canal during said maintenance procedures, the improvement comprising an internals storage means integrally formed within the fuel transfer canal, wherein;
   (a) an upper internals storage area is defined by a plurality of concrete support ledges projecting radially inwardly from and integrally formed with said walls of the fuel transfer canal, said support ledges being disposed at an intermediate axial level in a first generally circular array and adapted to receive said upper internals thereon;
   (b) a lower internals storage area is defined by a plurality of concrete support columns projecting upward from and integrally formed with the floor of the fuel transfer canal, said support columns being disposed in a second generally circular array and adapted to recieve said lower internals thereon, and each of said support ledges and columns further including:
      (i) an embedment plate at least partially embedded therein;
      (ii) a top plate disposed above the embedment plate and having two bearing pads disposed thereon for receiving said respective internals, and two vertically disposed guide plates securely mounted on the top plate for positioning the respective internals thereon; and
      (iii) means for providing lateral adjustment of the top plate with respect to the embedment plate disposed between said embedment and top plates.

11. The improvement as recited in claim 10, wherein the lateral adjustment means is comprised of a middle plate disposed between the top plate and the embedment plate, a top plate boss secured to the top plate and having a countersunk bore therethrough, a middle plate boss secured to the middle plate and having a threaded aperture therein, the aperture being concentric with the bore, and a cap screw adjusted to pass through the bore and threadingly engage the aperture, whereby the top plate is laterally translated with respect to the middle plate by rotation of the cap screw within the aperture.

12. The improvement as recited in claim 10, wherein each of said guide plates has a radially inwardly directed chamfered leading edge on its top portion to facilitate placement of said upper or lower internals upon said bearing pads.

13. The improvement as recited in claim 10, wherein the upper internals storage area includes four concrete ledges oriented in the first generally circular array spaced 90° apart.

14. The improvement as recited in claim 13, wherein the lower internals storage area includes four concrete columns oriented in the second generally circular array spaced 90° apart.

15. The improvement as recited in claim 10, wherein the upper internals storage area and the lower internals storage area each include at least two upwardly directed guide studs which project above said storage areas to provide proper orientation of said upper and lower internals upon removal from and replacement within the nuclear reactor pressure vessel.

16. In a nuclear reactor power plant which includes a nuclear reactor pressure vessel having an upper internals structure and a lower internals structure which are removed therefrom while performing maintenance procedures, the nuclear reactor pressure vessel being housed within a generally cylindrical concrete containment building having concrete floor and walls, the containment building defining a refueling cavity comprised of a reactor cavity and a fuel transfer canal, the reactor pressure vessel being disposed within the reactor cavity and said upper and lower internals structures are stored within the fuel transfer canal during said maintenance procedures, the improvement comprising an internals storage means integrally formed within the fuel transfer canal, wherein:
   (a) an upper internals storage area is defined by four concrete support ledges projecting radially inwardly from and integrally formed with said walls of the fuel transfer canal, said support ledges being disposed at an intermediate axial level spaced 90° apart in a first generally circular array and adapted to receive said upper internals thereon;
   (b) a lower internals storage are is defined by four concrete support columns projecting upward from and integrally formed with the floor of the fuel transfer canal, said support columns spaced 90° apart in a second generally circular array and adapted to receive said lower internals thereon.

17. The improvement as recited in claim 16, wherein each of said support ledges and columns further includes:
   (i) an embedment plate at least partially embedded therein;
   (ii) a top plate disposed above the embedment plate and having two bearing pads disposed thereon for receiving said respective internals, and two vertically disposed guide plates securely mounted on the top plate for positioning the respective internals thereon; and
   (iii) means for providing lateral adjustment of the top plate with respect to the embedment plate disposed between said embedment and top plates.

18. The improvement as recited in claim 17, wherein the lateral adjustment means is comprised of a middle plate disposed between the top plate and the embedment plate, a top plate boss secured to the top plate and having a countersunk bore therethrough, a middle plate boss secured to the middle plate and having a threaded aperture therein, the aperture being concentric with the bore, a shim pack having a hole therethrough disposed between said top plate and middle plate bosses and a cap screw adjusted to pass through the bore and the hole and threadingly engage the aperture, whereby the top plate is laterally translated with respect to the middle plate by rotation of the cap screw within the aperture.

19. The improvement as recited in claim 18, wherein each of said guide plates has a radially inwardly directed chamfered leading edge on its top portion to facilitate placement of said upper or lower internals upon said bearing pads.

20. The improvement as recited in claim 19, wherein the upper internals storage area and the lower internals storage area each include two upwardly directed guide studs which project above said storage areas to provide proper orientation of said upper and lower internals upon removal and replacement within the nuclear reactor pressure vessel.

* * * * *